Patented Aug. 26, 1924.

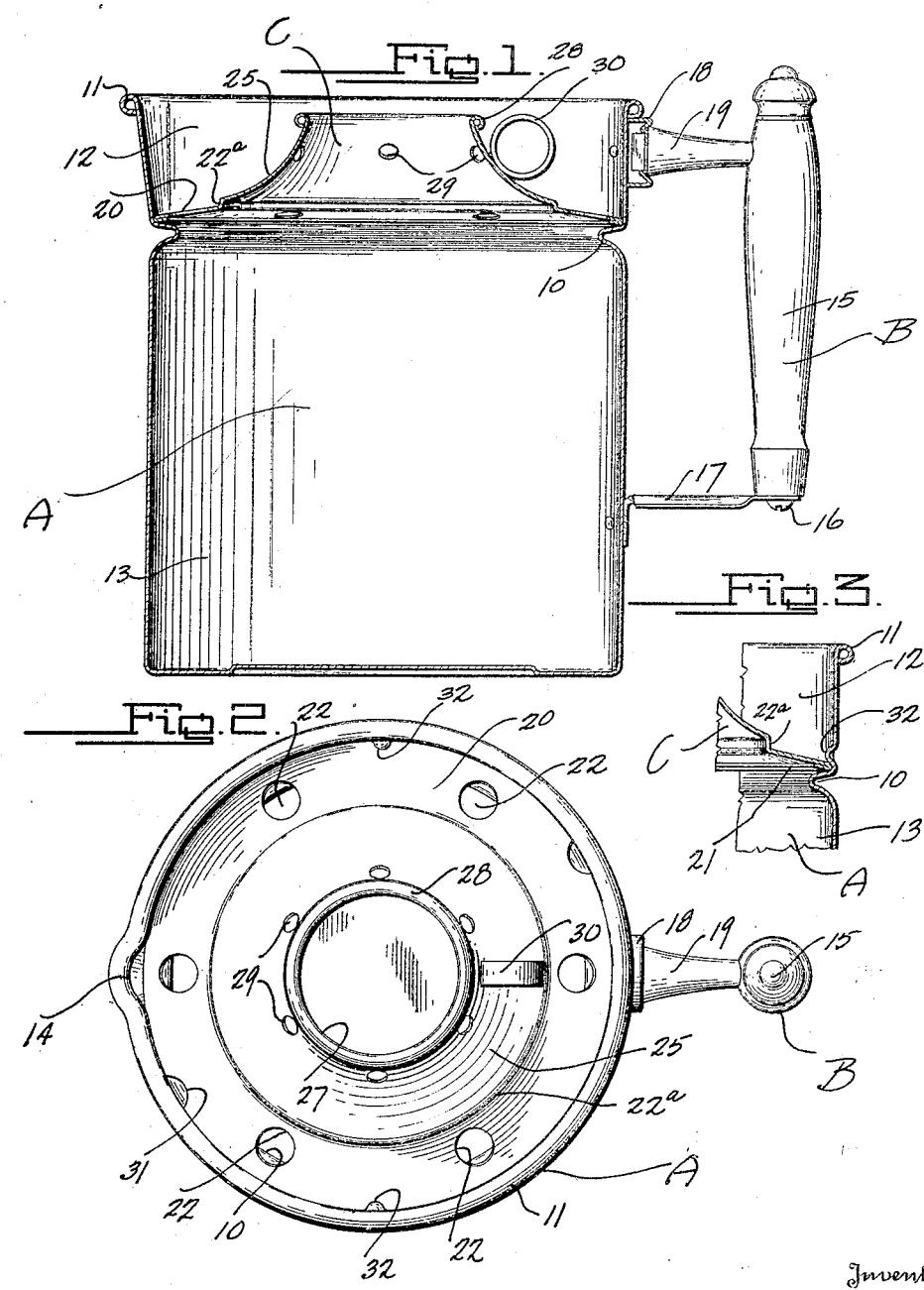

1,505,980

UNITED STATES PATENT OFFICE.

FRANK J. STOLITZKA, OF MASSILLON, OHIO.

COOKING UTENSIL.

Application filed June 8, 1921. Serial No. 476,045.

*To all whom it may concern:*

Be it known that I, FRANK J. STOLITZKA, a citizen of the United States, residing at Massillon, in the county of Stark and State of Ohio, have invented certain new and useful Improvements in Cooking Utensils, of which the following is a specification.

This invention relates to improvements in cooking utensils to prevent loss of liquid incident to boiling thereof.

The primary object of the invention is the provision of a cooking utensil, including a certain novel baffle cover, for intercepting of liquids in their tendency to boil over, when heated beyond a predetermined boiling degree, causing the liquid to release its excessive steam, and return to the utensil.

A further object of the invention is the provision of a cooking utensil, embodying a container, and a baffle cover therefore, said baffle cover constructed for guiding boiling liquids in such manner as to release excessive steam; acting in such manner as to restrict expansion of the liquid incident to boiling.

Other objects and advantages will be apparent during the course of the following detailed description.

In the accompanying drawing, forming a part of this specification, and in which similar reference characters designate corresponding parts throughout the several views:

Figure 1 is a vertical cross sectional view through the improved cooking utensil, showing the parts in assembled relation.

Fig. 2 is a plan view of the improved cooking utensil.

Fig. 3 is an enlarged fragmentary view, showing the relation of the detachable baffle cover with respect to the container.

In the drawing, wherein for the purpose of illustration is shown the preferred embodiment of my invention, the letter A designates a container for cooking purposes, including a handle structure B. A baffle cover C of novel formation is provided, for disposition adjacent the top of the container A, to prevent overflowing of boiling liquids and the like.

The container A, is preferably of aluminum or some similar utensil material, the same being preferably circular in formation. An inwardly crimped baffle supporting flange 10 is provided circumferentially extending inwardly of the container A, and below the top 11 thereof; the top 11 being beaded. It is preferred that the cylindrical portion 12 of the container A upwardly of the supporting flange 10 be formed of substantially the same diameter as the lower portion 13. A spout 14 is preferably provided in the upper portion 12, for ready pouring of liquid, and the like, from the container.

The handle structure B, may of course be of any formation, in the present instance comprising a wooden hand engaging portion 15, detachably supported by a screw 16, through a metal shelf or bracket 17; the bracket 17 being riveted or otherwise secured to the exterior of the portion 13. The portion 12, is preferably provided with a bracket supporting cap 18 which is riveted or otherwise secured exteriorly of the portion 12, for receiving the wooden bracket 19; the bracket 19 engaging the hand engaging portion 15 for supporting the same vertically, cooperating with the bracket 17 in this respect.

The cover C, is preferably of aluminum or some similar sheet material, being preferably circular in formation, for ready insertion interiorly of the portion 12, and to rest upon the inwardly crimped flange 10. The cover C, comprises a substantially straight upwardly sloping marginal portion 20, flanged under as at 21 upon its extreme outer circumference, for reinforcing purposes. The marginal portion 20, is provided with evenly spaced apertures 22 circumferentially thereof, for purposes to be subsequently set forth. The inner end of the portion 20 is bent upwardly at 22$^a$ in substantially vertical manner, and is integrally connected to the upwardly and arcuate central portion 25. The portion 25, slopes gradually upward in arcuate manner, and at an angle with respect to the upward sloping marginal portion 20. The portion 25, moreover, terminates at its extreme upper end in a relatively large aperture 27, centrally of the cover C: the extreme top of the arcuate portion 25 being outwardly beaded at 28, as marginal reinforcement about the aperture 27. Apertures 29 are provided circumferentially, in spaced relation, in the arcuate portion 25: said aperatures 29 being relatively smaller than the apertures 22 and for a purpose to be subsequently set forth. A finger engaging handle 30, is preferably soldered or otherwise secured exteriorly upon the arcuate portion 25, for ready detachment of the cover C from its supporting flange 10.

In order to readily secure and lock the cover C upon the flange 10, within the portion 12, suitable indentations 31 are provided in arcuate manner upon the outer circumference of the marginal portion 20, for ready insertion over the depressed, or inwardly extending locking lugs 32 formed in the portion 12 of the container A, immediately above the supporting flange 10. Thus, the cover C can be readily inserted over the projections 32, by means of the indentations 31, and upon a slight rotation, or oscillation of the cover C, the supporting projections 32 will overlie the circumference of the portion 20, to lock the cover C upon its supporting flange 10.

The liquid or substance to be cooked is disposed within the portion 13 of the container A, and below the supporting flange 10. As the same is heated for boiling purposes, it expands incident to creation of steam therein. It is a well known fact that milk boils very readily, and expands at a very low temperature, thus rendering it rather difficult to boil the same without very careful attention. The liquid within the container A, as the same expands incident to boiling, will first engage the lower surface of the upward sloping marginal portion 20. The bubbles formed upon the top of the boiling substance as they engage this portion 20, will be ruptured, and the steam therein pass through the perforations 22 and escape. However, should the substance or liquid be of a considerable temperature, and rise rapidly in the container A, the same will further impinge on the interior of arcuate portion 25, and the bubbles thereon will be ruptured as they pass thereover; the steam passing out of the relatively small apertures 29. The boiling mass will in some cases run through the relatively large aperture 27. At this point, attention is called to the fact, that when the cover C is mounted on the flange 10, the extreme top 28 thereof will lie on a level below the beaded top 11 of the portion 12. Consequently, as the over-boiling mass of liquid flows through the relatively large aperture 27, the same will be retained within the portion 12 of container A, flowing down over the outer surface of the sloping portions 20 and 25. In most instances, the baffle plate C will prevent over-flowing of boiled liquid, even when over-boiling for a considerable length of time, and heated at a very high temperature.

Various changes in the shape, size, and arrangement of parts may be made to the form of the invention herein shown and described, without departing from the spirit of the invention or the scope of the claims.

I claim:

1. A cooking utensil comprising a container, and a detachable member for said container including an outer substantially flat sloping portion provided with circumferential rows of perforations therein, and an upper arcuate sloping portion terminating in a relatively large opening and provided with a circumferential row of perforations adjacent said central opening.

2. A cooking utensil comprising a container having a supporting flange below the top marginal edge thereof and extending inwardly thereof, and a baffle member for said container formed of sheet material and including an outer relatively flat marginal portion having an overturned outer edge for resting upon the supporting flange of said container, said flat portion from said supporting flange sloping gradually upwardly and having a substantially vertical portion bent upwardly thereon, said baffle member having a central upwardly extending arcuate portion connected to said vertical portion and terminating in a relatively large opening centrally of said member, said flat portion having relatively large perforations therethrough and said arcuate portion having relatively smaller perforations therethrough, said baffle member when resting upon said supporting flange extending upwardly within the container and disposed entirely below the upper marginal edge thereof.

FRANK J. STOLITZKA.